June 26, 1962

W. R. EDWARDS ET AL 3,040,727

FLUID OPERATED DISPENSER

Filed Aug. 14, 1957

INVENTORS
WILLIAM R. EDWARDS
WILLIAM R. MC MURRAN
BY
ATTORNEYS

June 26, 1962 W. R. EDWARDS ET AL 3,040,727
FLUID OPERATED DISPENSER
Filed Aug. 14, 1957 3 Sheets-Sheet 2

INVENTORS
WILLIAM R. EDWARDS
WILLIAM R. McMURRAN
BY
ATTORNEYS

INVENTORS
WILLIAM R. EDWARDS
WILLIAM R. MCMURRAN
BY
ATTORNEYS

United States Patent Office 3,040,727
Patented June 26, 1962

3,040,727
FLUID OPERATED DISPENSER
William R. Edwards, California, Md., and William R. McMurran, Cocoa Beach, Fla., assignors to the United States of America as represented by the Secretary of the Navy
Filed Aug. 14, 1957, Ser. No. 678,255
12 Claims. (Cl. 124—11)
(Granted under Title 35, U.S. Code (1952), sec. 266)

The invention described herein may be manufactured and used by or for the Government of the United States of America for governmental purposes without the payment of any royalties thereon or therefor.

The present invention relates to a fluid operated dispenser and more particularly to a fluid operated dispenser which dispenses material from a chamber.

It is known that finely divided metallic particles, commonly called chaff, are excellent reflectors of high frequency radiation, such as radar beams. This phenomenon is used to give a false indication of a target to enemy radar, and in aerial warfare it is known that chaff may be dispensed for this purpose by an aircraft undergoing attack by a radar equipped fighter aircraft. If the chaff is dispersed properly, it appears to be a very large target to the attacking radar, which will then track the chaff instead of its intended target. In the past, there has been no chaff dispenser available that was capable of dispensing the chaff reliably from an aircraft flying at supersonic velocities. Previous chaff dispensers depended on gravity or pusher type mechanisms, neither of which proved satisfactory.

There is a great need for a reliable chaff dispenser, in view of the unsatisfactory results of past dispensers as the only other defense against an attacking aircraft equipped with fire control radar is to out-maneuver the attacking aircraft. Therefore, it is readily seen that a reliable chaff dispenser will provide a means of defeating fire control radar and act as an electronic life preserver.

An object of the present invention is the provision of a novel type fluid operated dispenser.

Another object is to provide a fluid operated dispenser that can be used to dispense material from a high speed aircraft.

A further object of the invention is the provision of a fluid operated dispenser which is reliable and rapid in dispensing chaff.

Other objects and many of the attendant advantages of this invention will be readily appreciated as the same becomes better understood by reference to the following detailed description when considered in connection with the accompanying drawings wherein.

Figure 1:
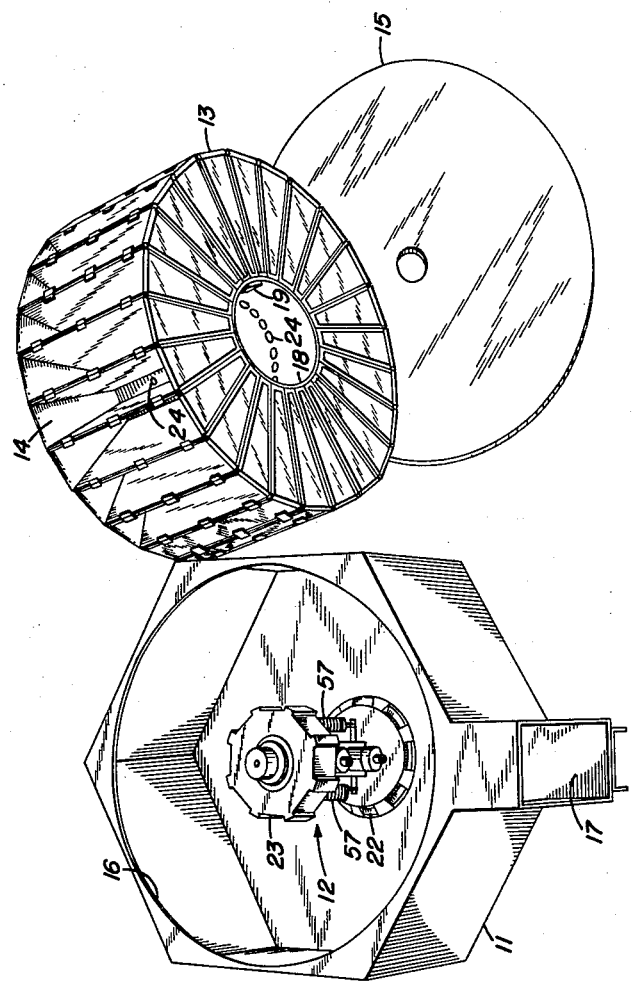
FIG. 1 is a partially disassembled, perspective view of the fluid operated dispenser of the present invention.

Referring now to the drawings, wherein like reference characters designate like or corresponding parts throughout the several views, there is shown in FIG. 1 a hexagonal casing 11 with an ejector 12 mounted in it, a drum 13 having a plurality of circumferentially distributed wedge shaped chambers 14, and a lid 15 for closing the opening 16 in the casing 11. An exhaust passage 17 is provided in the wall of the casing 11 to allow chaff to be dispensed therethrough from chambers 14.

As will be more fully described hereinafter, chaff will be dispensed from a chamber 14 in response to fluid pressure exhausted from the ejector 12 and means driven by the ejector 12 will index another chaff loaded chamber 14 into position with the ejector 12 for the chaff to be dispensed.

The drum 13 has a central opening 18 therethrough of sufficient diameter to allow the drum 13 to be placed around the ejector 12. Two keys 19 and 21 (FIGS. 1 and 3) are fixed to the walls of the opening 18 in the drum 13. The ejector 12 is provided with lower and upper keyways 22 and 23 to receive the keys 19 and 21, respectively, when the drum 13 is placed over the ejector 12.

A plurality of ports 24 are provided in the drum 13 connecting each of the chambers 14 with the opening 18. The ports 24 are arranged in rows and are equidistant from the sides of the drum 13.

Figure 3:
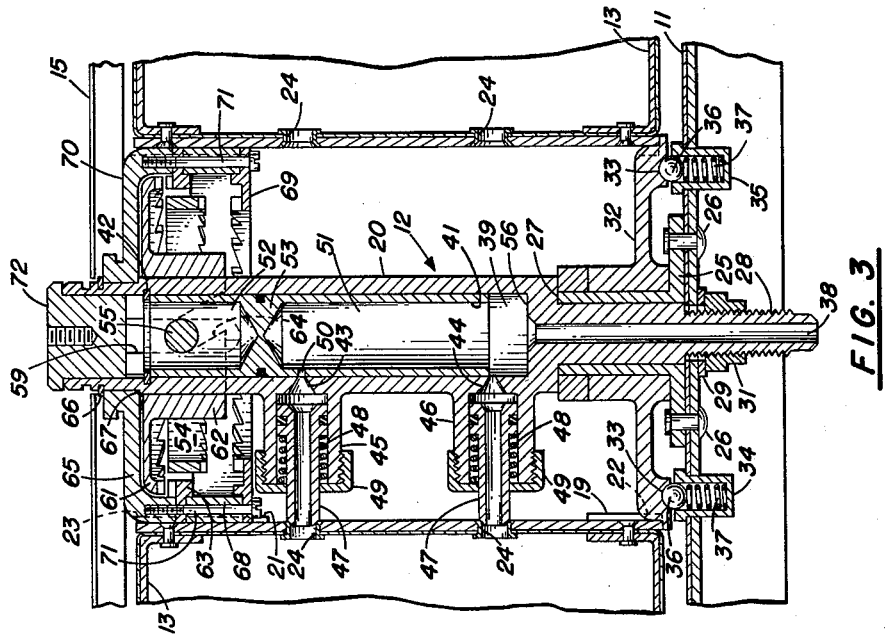
FIG. 3 is a vertical, sectional view of the ejector mounted in the casing with the drum installed.
Figure 2:
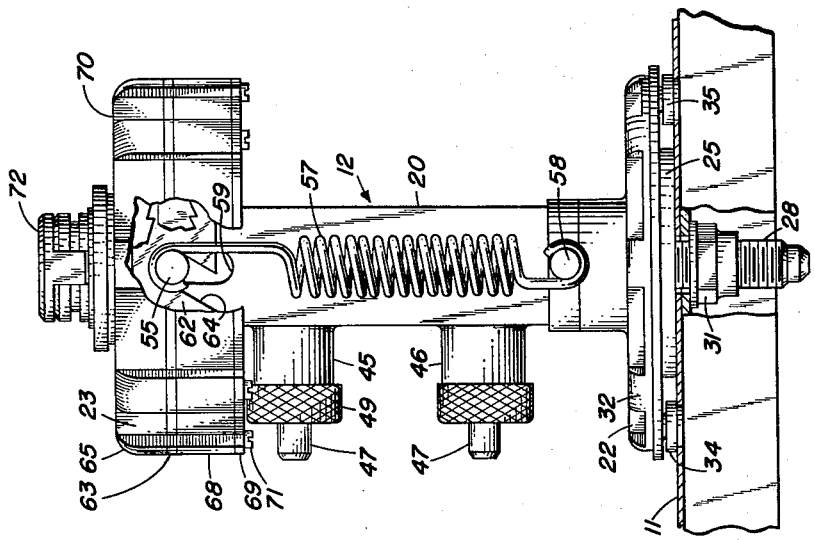
FIG. 2 illustrates a side view with parts broken away of the ejector of the dispenser mounted in the casing thereof.

Referring to FIGS. 2 and 3, the ejector 12 is shown mounted on the casing 11. A boss 25 is fixed to the casing 11 by any suitable means, such as rivets 26. The ejector body 20 is seated in boss 25 with the upper end of the boss 25 acting as a stop and bearing against a shoulder 27 provided on the ejector body 20. The lower end 28 of the ejector body 20 is threaded and receives a washer 29 and a nut 31 to lock the ejector body 20 to the casing 11.

A detent plate 32 is rotatably mounted on the boss 25 and has a plurality of circumferential equally spaced detent notches 33 provided in the periphery of the lower surface thereof. A pair of ball retainers 34 and 35 are fixed to the casing 11 and each holds a ball detent 36 biased by a spring 37 into engagement with the notches 33 in the detent plate 32.

The lower end of the drum 13 is locked to the rotatable detent plate 32 by means of the key 19 engaging the keyway 22. The lower end 28 of the ejector body 20 is provided with a narrow elongated inlet passage 38 which communicates with a wider chamber 39 in the ejector body 20. The chamber 39 extends from a surface 56 in the ejector body 20 to the upper end thereof.

A primary piston 41 is slidably mounted in chamber 39 and is limited in its upward and downward movement by a retaining ring 42 fixed to the walls of the chamber 39 and the surface 56, respectively.

Exhaust passages 43 and 44 are provided in the walls of the ejector body 20 to communicate the chamber 39 with exhaust nozzles 45 and 46, respectively. A hollow secondary piston 47 is slidably mounted in each of the nozzles 45 and 46 and retained therein by means of a spring 48 and cap 49. The exhaust nozzles 45 and 46 are positioned to enable the secondary pistons 47 to move into contact with ports 24 in drum 13.

The primary piston 41 is divided into chambers 51 and 52 by a partition 53. The chamber 51 is open to chamber 39 in ejector 20. An exhaust opening 50 is provided in the wall of the piston 41 communicating the exhaust passage 43 with the chamber 51 when the piston 41 is in the position shown in FIG. 3.

A downwardly facing ring gear 54 is rigidly connected to the primary piston 41 by a pin 55. The lower end of the primary piston 41 is yieldingly held in contact with the surface 56 in ejector body 20 by means of a pair of springs 57, (FIG. 2) as one end of each of the springs 57 is placed around an end of the pin 55 and each of the other ends of each of the springs 57 is placed around the opposite end of a pin 58 fixed to the boss 25.

The upper end of the ejector body 20 containing the chamber 52 has a pair of elongated U-shaped slots 59 provided therethrough which receives the pin 55 and allows the pin 55 and piston 41 to move up and down.

A downwardly facing ring gear 61 having a hub 62 is rotatably mounted on the upper end of the ejector body 20 and functions as a driving pawl in a ratchet. The driven ratchet wheel of the ratchet is an upwardly facing ring gear 63, whose function will be more fully described hereinafter. The hub 62 of the ring gear 61 is provided with two diagonal cam slots 64 which receive the pin 55. When the piston 41 and the pin 55 are moved upward the pin 55 operates in the diagonal slots 64 as a cam and imparts a small counterclockwise rotation to the ring gear 61, when looking at a top plan view of FIGS. 2 and 3.

A cover 65 is rotatably mounted on the upper end of ejector body 20 and is prevented from upward or downward movement by a retaining ring 66 and a shoulder 67 provided on the ejector body 20. The cover 65, ring gear 63 (driven ratchet wheel), a spacer 68 therebeneath and an upwardly racing limit ring gear 69 beneath spacer 68 constitute a rotatable indexing unit 70 which is held in assembled relationship by means of the elongated screws 71.

When the lower end of the primary piston 41 rests against the surface 56 in the ejector body 20, the ring gear 61 mates with the ring gear 63 to form a ratchet, and the ring gear 54 mates with the limit ring gear 69.

The upper end of the drum 13 is locked to the indexing unit 70 by means of the key 21 engaging the keyway 23. It is readily seen that the indexing unit 70 and the detent plate 32 act as upper and lower supports, respectively, for the drum 13.

A plug 72 closes the upper end of ejector body 20 which has a cover 15 secured thereto by any suitable means.

Figure 4:
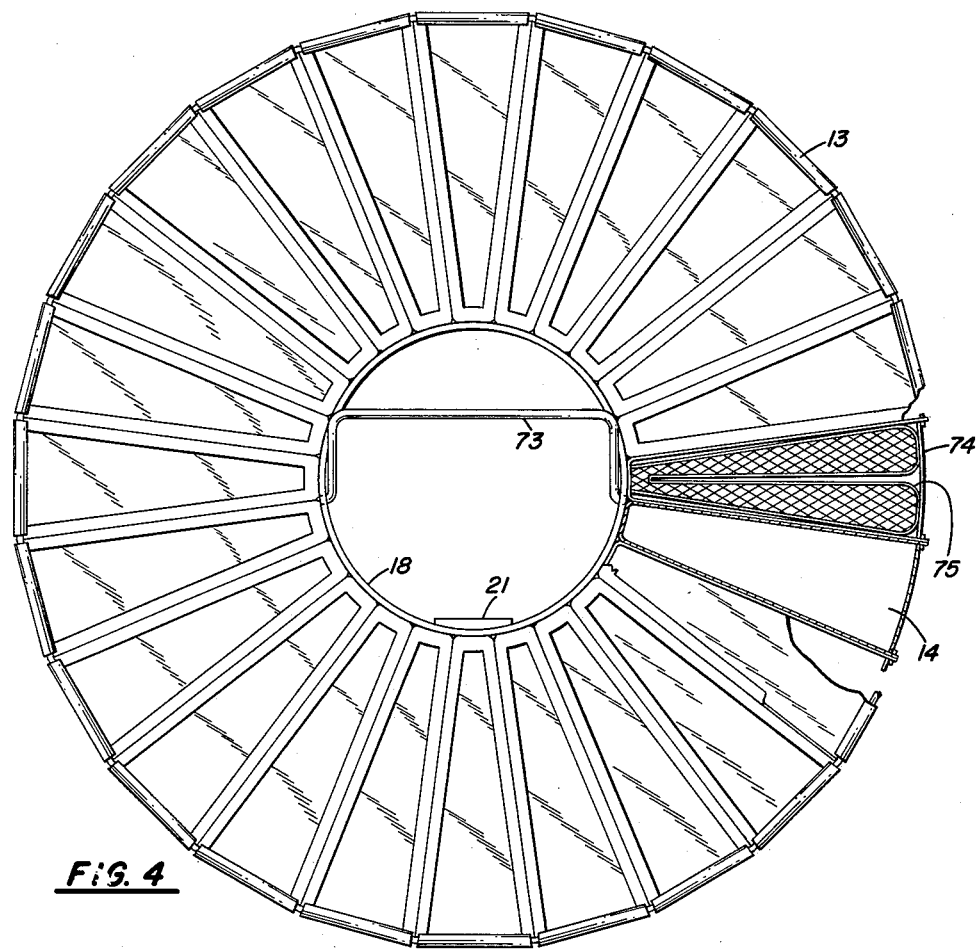
FIG. 4 shows a plan view of the drum, with parts broken away.

Referring to FIG. 4, the drum 13 is shown having a plurality of wedge shaped chambers 14. The same number of chambers 14 are provided in the drum 13 as ball detents 36 are provided in the detent plate 32, e.g. twenty-four in the embodiment shown. A handle 73 is attached to the drum 13 for convenience in handling.

Figures 5, 6, 7:
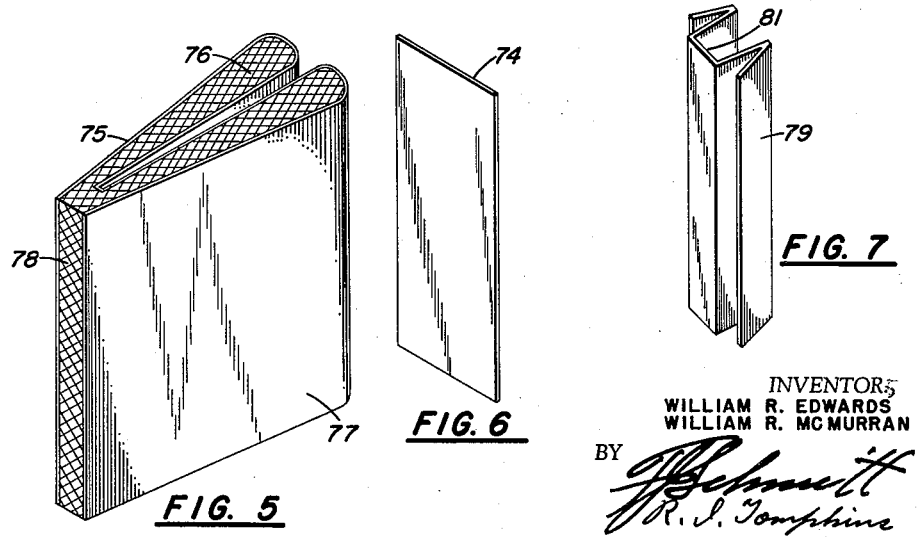
FIG. 5 illustrates one embodiment of a chaff package.
FIG. 6 is a cover for closing the exits of the chambers in the drum.
FIG. 7 illustrates a seal to be used in the absence of a chaff package.

A cover 74, FIG. 6, closes each of the chambers 14, and can be made of any suitable material such as hard surface paper.

FIG. 5 shows a wedge shaped chaff package 75 that can be inserted into each of the chambers 14. The package 75 is made up of chaff 76 surrounded by a paper wrapping 77. The package 75 is bifurcated, the parts being joined together at one end 78. The edge of the end 78 does not have the wrapping 77 enclosing the chaff 76.

Referring to FIG. 4, the package 75 is shown installed in one chamber 14 of the drum 13 and the cover 74 in place.

FIG. 7 discloses a tapered seal 79 that is used in lieu of the package 75. The tapered seal 79 is bent in the shape shown in FIG. 7 and inserted into the inner end of chamber 14. The chaff contacting surface 81 of the seal 79 is placed facing outward toward the cover 74. Chaff is then stuffed into the chamber 14 between the seal 79 and the position where the cover 74 will be placed.

In assembling the parts of the dispenser, the wedge shaped chambers 14 of the drum 13 are first loaded with chaff. Either of the two means shown in FIGS. 5 and 7 can be used. If the tapered seals 79 are used, it should be understood that when the fluid pressure exhausting through ports 24 start forcing the seals 79 outward, the seals 79 will expand to form a seal with the walls of the wedge shaped chambers 14, and discreetly admit air to the layers of chaff causing them to be air borne within the chamber 14. This causes the chaff to instantly be blossomed into the airstream. But if the package 75 is used, the chaff is held together for a complete explosion when forced out of the chambers 14.

After the drum is fully loaded with chaff, it is placed over and locked in relationship with the ejector 12 by means of the keys 19 and 21 engaging keyways 22 and 23, respectively. In this position the exhaust nozzles 45 and 46 are in operative alignment with the ports 24 in the drum 13 and the exhaust passage 17 in casing 11.

At the beginning of the operating cycle all of the parts of the dispenser are at their rest positions. A surge of fluid pressure is then supplied to the inlet passage 38 by any suitable source, such as a 1500 p.s.i. pneumatic gun charger which is standard equipment on a fighter aircraft. The fluid pressure passes through passage 38 into chambers 39 and 51 moving the primary piston 41 upward against the tension of the surings 57 and moving the pin 55 upward in the U-shaped slot 59.

This upward movement of the primary piston 41 and pin 55 first disengages the ring gear 54 from the limit ring gear 69 and thus unlocks the indexing unit 70 from the ejector body 20. The continued upward movement of the piston 41 pushes pin 55 into the diagonal cam slots 64 causing a small counterclockwise rotation to the driving ring gear 61 and also disengaging the driving ring gear 61 from the driven ring gear 63.

At this point, the exhaust opening 50 and the lower end of the piston 41 have uncovered the exhaust passages 43 and 44, respectively. The fluid pressure in chambers 39 and 51 escapes through the passages 43 and 44, into the nozzles 45 and 46 and forces the secondary pistons 47 into sealing contact with the ports 24 in the drum 13. The fluid pressure also passes through the hollow pistons 47 into a chamber 14 and ejects the chaff 76 therein out through the exhaust passage 17 in casing 11.

The tension in springs 57 then pulls the primary piston 41 downward thereby closing the exhaust passages 43 and 44. In the same operation, the springs 57 pull the pin 55 downward in the U-shaped slot 59 and the diagonal cam slots 64 which imparts a clockwise motion to the driving ring gear 61 and simultaneously pulls the ring gear 61 into contact with the driven ring gear 63. Thus, the driven ring gear 63 is also given a clockwise motion which in turn rotates the indexing unit 70. As the drum 13 is keyed to the rotating indexing unit 70, it will be correspondingly rotated as the driving ring gear 61 is rotated.

As the drum 13 is rotated, the detent plate 32 keyed to the drum 13 is also rotated so that the ball detent 36 is compressed against the spring 37 and the next notch 33 on the detent plate 32 is rotated toward engagement with the ball detent 36. At the same time, the ring gear 54 connected to the pin 55 is moving into contact with the limit ring gear 69. The timing is such that the combined action of the ball detents 36 and notches 33, and the ring gears 54 and 69 serve to lock the drum 13 so that a new set of ports 24 and a loaded chamber 14 are lined up with the exhaust nozzles 44 and 46 to be ready for a new cycle of operation.

The operation may be repeated in quick succession or by individual bursts as required for jamming of the attacking radar.

What is claimed is:

1. A fluid operated dispenser comprising a fixed ejector having a body, said body having a fluid chamber therein and fluid inlet and exhaust passages communicating with said chamber, a spring biased piston sliadably mounted in said chamber, said piston being responsive to inlet fluid pressure and controlling the opening and closing of said exhaust passage, a container having a plurality of chambers therein for holding material to be dispensed and positioned adjacent said exhaust passage, each chamber having an inlet port and a material exit, said ports positioned in a row and in fluid operative receiving relationship with said exhaust passage, an indexing means rotatably mounted on said body and rotatably connecting said container with said body, a driving member having a hub rotatably mounted on said body, a first locking member positioned to rotate about said body, connecting means operatively connecting said driving member and said locking member with said piston for rotational movement of said members upon movement of said piston in response to fluid inlet pressure, said indexing means comprising a second locking member positioned to lockingly mate with said first locking member when said piston is in the closed exhaust passage position, and a driven member positioned to be driven by said driving member when the inlet pressure is reduced and the piston is urged into the closed exhaust passage position by said spring.

2. A fluid operated dispenser comprising a fixed ejector havin a body, said body having a fluid chamber therein and fluid inlet and exhaust passages communicating with said chamber, a spring biased piston slidably mounted in said chamber, said piston being responsive to inlet fluid pressure and controlling the opening and closing of said exhaust passage, a container having a plurality of chambers therein for holding material to be dispensed and positioned adjacent said exhaust passage, each chamber having an inlet port and a material exit, said ports positioned in a row and in operative fluid receiving relationship with said exhaust passage, an indexing means rotatably mounted on and rotatably connecting said container with said body, a driving pawl member having a hub rotatably mounted on said body, said hub having diagonally aligned slots therethrough, aligned U-shaped slots in said body, a first locking member positioned to rotate about said body, a pin received in said diagonal and U-shaped slots and connecting said first locking member to said piston whereby said pin will operate in said slots when said piston moves in response to inlet fluid pressure, said rotatable indexing means comprising a second locking member positioned to lockingly mate with said first locking member, and a driven wheel member positioned to be driven by said driving pawl member.

3. A fluid operated dispenser comprising a fixed ejector means having a body, said ejector body having a fluid chamber therein and fluid inlet and exhaust passages communicating with said chamber, a spring biased piston slidably mounted in said chamber, said piston being responsive to inlet fluid pressure and controlling the opening and closing of said exhaust passage, said spring normally holding the piston in a position closing the exhaust passage, a container having a plurality of chambers therein adapted to hold material to be dispensed and positioned adjacent said exhaust passage in said ejector body, each chamber having an inlet port and a material exit, said inlet ports positioned in a row and in operative fluid receiving relationship with said exhaust passage, an indexing means rotatably mounted on said body and rotatably connecting said container with said ejector body, a driving ring gear having a hub rotatably mounted on said ejector body, said hub having aligned diagonal slots therethrough, aligned U-shaped slots in said ejector body, a first locking ring gear, pin means received in said diagonal and U-shaped slots and connecting said locking ring gear with said piston whereby said pin will operate in said slots as a cam and rotate said driving ring gear in one direction and rotate said locking ring gear in response to piston movement, said rotatable indexing means comprising a second locking ring gear positioned to lockingly mate with said first locking ring gear when said piston is in the closed exhaust passage position, and a driven ring gear positioned to be driven by said driving ring gear in the other direction when the inlet pressure is reduced and the piston is urged into the closed exhaust passage position by said spring.

4. The combination set forth in claim 3 and comprising a package of material in each of said container chambers, said package having a wrapping enclosing said material, and a cover closing each of the exits from each of said container chambers.

5. The combination set forth in claim 4 wherein the end of said package adjacent said fluid ports is absent of any wrapping.

6. The combination set forth in claim 4 wherein said package is bifurcated, and the end of said package joining the bifurcated branches is adjacent said ports and is absent of any wrapping.

7. The combination set forth in claim 3 and comprising a seal positioned in the end of each of said container chambers adjacent said ports, a cover closing the exits from each of said container chambers, and material positioned in each of said container chambers between said seal and said cover.

8. A fluid operated dispenser comprising a fixed ejector having a body, said body having a fluid chamber therein and a fluid inlet communicating with said chamber, at least one exhaust nozzle on said body, an exhaust passage in said body communicating said chamber with said nozzle, a primary piston slidably mounted in said chamber and responsive to inlet pressure and controlling the opening and closing of said exhaust passage, a spring normally biasing said primary piston into a position closing said exhaust passage, a hollow secondary piston slidably mounted in said nozzle and extending outwardly therefrom, a spring normally biasing said secondary piston against said exhaust passage, a container having a plurality of chambers therein for holding material to be dispensed, each of said chambers being positionable adjacent said secondary piston, each chamber having an inlet port and a material exit, said ports positioned in a row and in operative fluid receiving relationship with said secondary piston whereby said secondary piston is adapted to be forced outwardly into sealing contact with a port in response to fluid pressure, an indexing means rotatably mounted on and rotatably connecting said container with said body, a driving member having a hub rotatably mounted on said body, a first locking member positioned to rotate about said body, connecting means operatively connecting said driving member and said locking member with said primary piston for rotational movement of said members upon movement of said piston in response to inlet fluid pressure, said indexing means comprising a second locking member positioned to lockingly mate with said first locking member when said primary piston is in the closed exhaust passage position, and a driven member positioned to be driven by said driving member when the inlet pressure is reduced and the primary piston is urged into the closed exhaust passage position by said spring.

9. A fluid operated dispenser comprising a fixed ejector having a body, said body having a fluid chamber therein and a fluid inlet communicating with said chamber, at least one exhaust nozzle on said body, an exhaust passage in said body communicating said chamber with said nozzle, a primary piston slidably mounted in said chamber and responsive to inlet pressure and controlling the opening and closing of said exhaust passage, a spring normally biasing said primary piston into a position closing said exhaust passage, a hollow secondary piston slidably mounted in said nozzle and extending outwardly therefrom, a spring normally biasing said secondary piston against said exhaust passage, a container having a plurality of chambers therein for holding material to be dispensed and positioned adjacent said secondary piston, each chamber having an inlet port and a material exit, said ports positioned in a row and in fluid operative receiving relationship with said secondary piston whereby said secondary piston is adapted to be forced outwardly into sealing contact with a port in response to fluid pressure, an indexing means rotatably mounted on and rotatably connecting said container with said body, a driving pawl member having a hub rotatably mounted on said ejector body, said hub having diagonally aligned slots therethrough, aligned U-shaped slots in said ejector body, a first locking member, a pin received in said diagonal and U-shaped slots and connecting said first locking member to said primary piston whereby said pin will operate as a cam in said slots when said piston moves in response to inlet pressure, said rotatable indexing means comprising a second locking member positioned to lockingly mate with said first locking member, and a driven ratchet wheel member positioned to be driven by said driving pawl member.

10. In a fluid operated dispenser, an ejector having a body, said body having a fluid chamber therein and fluid inlet and exhaust passages communicating with said chamber, a piston slidably mounted in said chamber, said piston being responsive to inlet fluid pressure and controlling the opening and closing of said exhaust passage, a spring normally biasing said piston into a position closing said exhaust passage, an indexing means rotatably mounted on said body, a driving ring gear having a hub rotatably mounted on said body, a first locking ring gear positioned to rotate about said body, connecting means operatively connecting said driving ring gear and said first locking ring gear with said piston for rotational movement of said gears upon movement of said piston in response to inlet fluid pressure, said indexing means comprising a second locking ring gear positioned to lockingly mate with said first locking ring gear when said piston is in the closed exhaust passage position, and a driven ring gear positioned to be driven by said driving ring gear when the inlet pressure is reduced and the piston is pulled into the closed exhaust passage position by said spring.

11. The combination set forth in claim 10 wherein said connecting means comprises aligned U-shaped slots through said body, aligned diagonal slots through said hub, a pin connected to said piston and received in said U-shaped and diagonal slots, an end of said pin connected to said first locking ring gear, whereby said pin will operate in said slots as a cam and rotate said driving ring gear in both directions and lock and unlock said first and second locking ring gears in response to piston movement.

12. In a fluid operated dispenser, an ejector having a body, said body having a fluid chamber therein and fluid inlet and exhaust passages communicating with said chamber, a primary piston slidably mounted in said chamber, said piston being responsive to inlet fluid pressure and controlling the opening and closing of said exhaust passage, a spring normally biasing said piston into a position closing said exhaust passage, indexing means rotatably mounted on said body, means operatively connected with said body and said indexing means and responsive to inlet fluid pressure for rotating said indexing means, an exhaust nozzle attached to said body and positioned to receive the exhaust pressure from said exhaust passage, a hollow secondary piston slidably mounted in said nozzle and extending outwardly therefrom, and a spring normally biasing said secondary piston against said exhaust passage, whereby said secondary piston is forced outwardly away from said exhaust passage when the fluid pressure passes through said exhaust passage and the hollow secondary piston.

References Cited in the file of this patent

UNITED STATES PATENTS

| 2,364,306 | Miller | Dec. 5, 1944 |
| 2,471,801 | Wallace | May 31, 1949 |
| 2,546,580 | Adams | Mar. 27, 1951 |

FOREIGN PATENTS

| 7,382 | Great Britain | 1903 |